June 10, 1969          K. D. SAHR          3,448,904
COMBINATION SPARE TIRE CARRIER AND TABLE
Filed Oct. 2, 1967
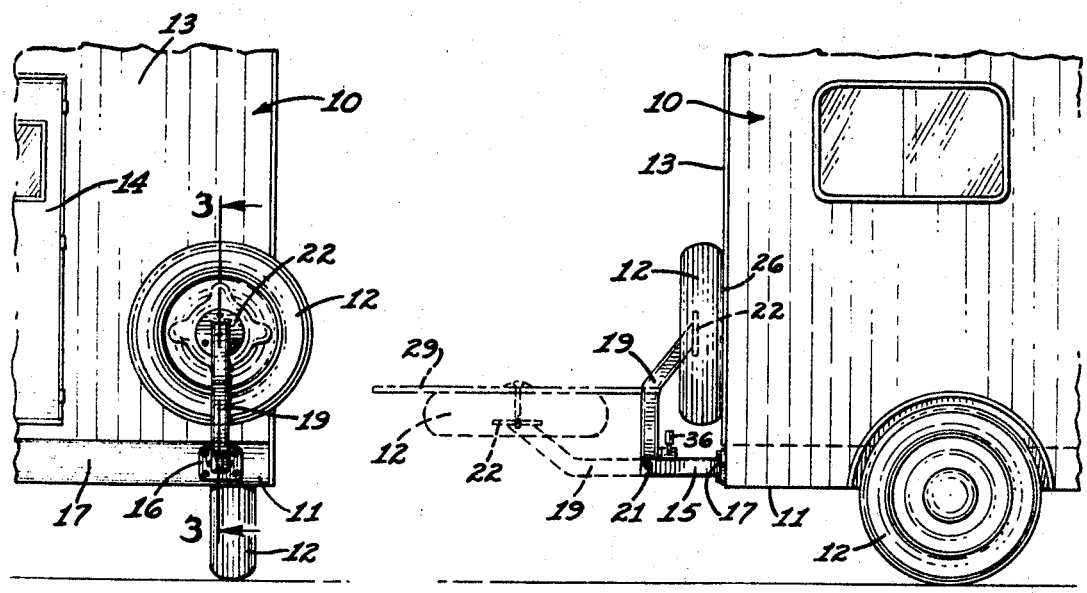
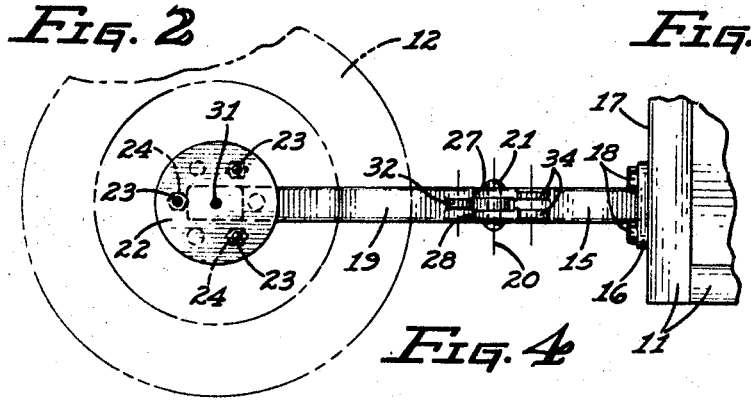
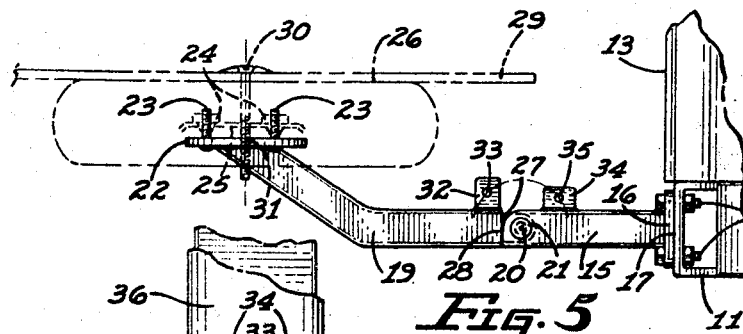
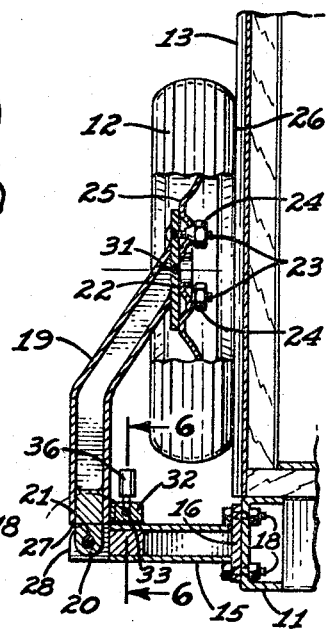
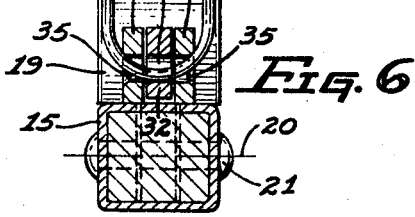
INVENTOR.
KENNETH D. SAHR.
BY
*Willard S. Groen*
ATTORNEY.

United States Patent Office 3,448,904
Patented June 10, 1969

---

3,448,904
COMBINATION SPARE TIRE CARRIER AND TABLE
Kenneth D. Sahr, Phoenix, Ariz., assignor to Sylvania Electric Products Inc., a corporation of Delaware
Filed Oct. 2, 1967, Ser. No. 672,381
Int. Cl. B62d *43/02;* A47b *3/06*
U.S. Cl. 224—42.01
2 Claims

ABSTRACT OF THE DISCLOSURE

A combination spare tire carrier and demountable table for campers in which the spare tire serves as a support for a table top support.

---

Cross-references to related applications

There are no cross-references to related applications.

Background of the invention (1) The field of this invention lies in a spare tire carrier which also may function as a table top support when in swung down position for removal and replacement of the spare tire from the carrier.

(2) Heretofore, there has not been a convenient way of stowing the spare tire in a camper nor to utilize the carrier and tire as a table top support. The inconvenience of having the spare tire down under the floor of the camper made it hard to get at and subjected the spare tire to the direct splash and dirt of the road so that it was messy to handle the tire. Further, this precluded its use as a table top support for sanitary reasons.

Summary of the invention

In this invention it is an object to provide a spare tire carrier conveniently positioned at the rear of a camper which may be swung down to dismounting and remounting position to facilitate handling the spare tire.

A further object is to provide a spare tire carrier which may be swung down to a position to provide a convenient support for a table top.

Brief description of the drawing

FIG. 1 is a fragmentary side elevation showing a spare tire carrier and table top support incorporating the features of this invention.

FIG. 2 is a fragmentary rear elevation of the tire carrier shown in FIG. 1.

FIG. 3 is an enlarged fragmentary section on the line 3—3 of FIG. 2.

FIG. 4 is a plan view of the apparatus shown in FIGS. 1 and 2, with the carrier in swung down table top supporting position.

FIG. 5 is a side elevation of the apparatus shown in FIG. 4.

FIG. 6 is an enlarged sectional view on the line 6—6 of FIG. 3.

Description of the preferred embodiment

As an example of one embodiment of this invention, there is shown a camper 10 mounted on the frame 11 of a suitable vehicle having road wheels 12. The back 13 may be provided with a suitable access door 14.

The combination tire carrier and table top support comprises a main horizontal support bracket 15 having an integral flange 16 on its front end that is secured to the rear surface 17 of the frame 11 by suitable bolts 18.

A swinging support arm 19 is pivotally mounted to swing about a transverse horizontal axis 20 by a suitable pin 21 carried in the rear end of the bracket 15.

The outer end of the swinging support arm 19 is provided with an integral wheel support plate 22 in which are fixed suitable wheel studs 23 arranged to receive wheel nuts 24 for securing the hub portion 25 of a road wheel 12 to the plate 22.

When the arm 19 is swung up to traveling position, FIG. 3, the outside surface 26 of the wheel 12 abuts against the back 13 of the camper rendering the wheel nuts 24 inaccessible preventing the spare wheel from being stolen. When the arm 19 is swung down to the position shown in FIG. 5, it is stopped with the outside surface of the wheel 12 in horizontal position by the abutment surface 27 on the arm 19 engaging the abutment surface 28 on the main support bracket 15. In this position the wheel 12 may be readily removed and replaced by removing the wheel nuts 24. Further, when the tire is in position on the plate 22, a table top 29 may be placed on the surface 26 of the wheel 12 and secured in position by suitable bolt 30 threadedly engaging into the center 31 of the plate 22 to hold it in demountable position on the wheel 12 for use as a table for meals and the like.

Means are provided to secure and lock the arm and tire in swung up vertical position of FIG. 3, a lug 32 having a hole 33 fixed to the arm 19 swings between a pair of laterally spaced lugs 34 with its hole 33 aligned with the holes 35 in the lugs 34, so that a pin or padlock 36 may be inserted through the holes 33 and 35.

While the apparatus herein disclosed and described constitutes a preferred form of the invention, it is also to be understood that the apparatus is capable of mechanical alteration without departing from the spirit of the invention.

I claim:

1. A combination spare tire carrier and table for a vehicle having:
   A. a frame including ground wheels,
   B. a body on said frame having an upwardly extending outwardly facing surface thereon,
   C. a spare ground wheel support including,
   D. a horizontally outwardly extending bracket fixed on the frame,
   E. a swinging arm pivotally mounted at the outer end of the bracket,
   F. abutment surface means on the bracket and arm to limit outward and downward swinging movement of the arm,
   G. means including removable wheel nuts for demountably securing the spare ground wheel on the outer end of and above the swinging arm with the inside face of the spare ground wheel facing downwardly when the swinging arm is in outward downward position,
   H. a releasable latch means interconnected between the bracket and the inner portion of the arm to secure the arm in an inwardly and upwardly swung position to position the spare ground wheel with its outside face adjacent the outwardly facing surface of the body to obscure access to the removable wheel nuts.

2. A combination spare tire carrier an dtable as set forth in claim 1 wherein a table top is arranged to be supported on the outside face of the spare ground wheel and to be demountably secured to the outer end of the arm in such position against the outside face for any opened out or retracted position of the arm and spare ground wheel.

References Cited

UNITED STATES PATENTS

| | | | |
|---|---|---|---|
| 871,254 | 11/1907 | Benjamin | 108—158 |
| 1,813,094 | 7/1931 | Appel | 214—451 |
| 3,186,612 | 6/1965 | Lyles | 224—42.01 |

FOREIGN PATENTS 895,142  5/1962  Great Britain.

HUGO O. SCHULZ, *Primary Examiner.*

U.S. Cl. X.R.

108—158